United States Patent
Mistry

(10) Patent No.: US 10,201,747 B2
(45) Date of Patent: Feb. 12, 2019

(54) MULTILAYERED ERGONOMIC GRIP FOR HANDHELD CONTROLLERS

(71) Applicant: KontrolFreek, LLC, Atlanta, GA (US)

(72) Inventor: Ashish Mistry, Atlanta, GA (US)

(73) Assignee: KONTROLFREEK, LLC, Atlanta, GA (US)

(*) Notice: Subject to any disclaimer, the term of this patent is extended or adjusted under 35 U.S.C. 154(b) by 77 days.

(21) Appl. No.: 15/370,420

(22) Filed: Dec. 6, 2016

(65) Prior Publication Data

US 2018/0154252 A1    Jun. 7, 2018

(51) Int. Cl.
 A63F 13/24 (2014.01)
 A63F 13/98 (2014.01)

(52) U.S. Cl.
 CPC ............. *A63F 13/24* (2014.09); *A63F 13/98* (2014.09)

(58) Field of Classification Search
 USPC .......................................................... 463/37
 See application file for complete search history.

(56) References Cited

U.S. PATENT DOCUMENTS

| | | | |
|---|---|---|---|
| 6,186,896 B1* | 2/2001 | Takeda | A63F 13/02 273/148 B |
| 6,923,443 B1 | 8/2005 | Hughes, IV | |
| 7,063,321 B2 | 6/2006 | Hussaini et al. | |
| 7,314,413 B2* | 1/2008 | Ogata | A63F 13/06 273/148 B |
| 7,762,553 B2 | 7/2010 | Harris | |
| D730,451 S | 5/2015 | Burgess et al. | |
| D733,802 S | 7/2015 | Burgess et al. | |
| D736,762 S | 8/2015 | Lovoi et al. | |
| D736,860 S | 8/2015 | Lovoi et al. | |
| D760,840 S | 7/2016 | Chatterjee et al. | |
| 2009/0162651 A1* | 6/2009 | Rios | A43B 13/04 428/354 |

* cited by examiner

*Primary Examiner* — Pierre E Elisca
(74) *Attorney, Agent, or Firm* — Thomas | Horstemeyer, LLP

(57) ABSTRACT

Disclosed are various embodiments for a multilayered ergonomic handheld controller grip. The multilayered aspect allows for flexibility and functionality in providing the user a moisture wicking, texturized, durable, antimicrobial, cushioned, and re-attachable customized grip for a handheld controller. The removable embodiment allows for customization and optimization to a user's own physical characteristics eliminating standard fit designs and providing unique customization for enhanced user performance.

17 Claims, 5 Drawing Sheets

MULTILAYERED ERGONOMIC GRIP FOR HANDHELD CONTROLLERS

FIELD OF THE INVENTION

The present invention relates to a multilayered and multipurpose ergonomic grip for handheld controllers and other controlling devices wherein a user's grip can be enhanced to achieve increased performance results.

BACKGROUND OF THE INVENTION

Handheld controllers come in various sizes, fashions, textures, and instrumentality. Handheld controllers have been designed and improved over the years to be as ergonomic and user friendly as possible. Two companies well known for producing handheld video game controllers are Microsoft Xbox™ and Sony Playstation™. Examples of handheld game controllers can also be seen in U.S. Pat. Nos. 5,207,426, and 6,102,802, though many more controllers exist and in varied fashion. Other companies well known for producing handheld controllers for remote operated vehicles are Syma™, Hubsan™, Parrot™, and DJI™. Though many other companies produce handheld controllers for remote operated vehicles and will occur to those of skill in the art.

Physical aspects of a handheld controller include an ergonomic body or housing for the electronic equipment and controller devices stored inside. The ergonomic body normally contains such items as an actuator, a processor, a transmitter, and a receiver, though other components such as a gyroscope are possible. The ergonomic body normally has cut outs or processes in which the varying components protrude for functionality with the user and the video game console. These processes normally blend seamlessly with the components to make a sealed housing with the input and output regions and the contents of the handheld controller itself.

The purpose of a handheld controller is to provide user input into a device such as a remotely operated vehicle, a video game console, or a video game computing machine. Handheld controllers can do this in many fashions such as with analog input or with digital input. Depending on the type of input certain portions of the game controller must be made applicable to a user's touch and hold. Further, certain portions of a handheld controller must also be capable of communicating to and from the device or console. Examples of this are infrared signal transmitter and receiver house on the body of the controller. Other communication methods are available and their placement within the handheld controller will occur to those of skill in the art.

Handheld controllers are inherently ergonomic to fit the shape of a user's hand. However, many of the controllers use a permanent plastic or resin shell that lacks texture and grip. These permanent plastic or resin shells provide strength and stability for the handheld controller by protecting the inside housing from user and environmental damage. However, the protection measure has side effects of poor traction, debris accumulation, hard exterior, non-padded, and lacks customization. Therefore, a problem to be solved is how to provide grip, compression absorption, and cleanliness, in a customizable fashion to handheld controllers to enhance aesthetics and player performance.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed is an ergonomic handheld controller grip that features multiple layers to provide aesthetic appeal and enhanced performance. In the following discussion, a general description of the accessory and its components is provided, followed by a discussion of the operation of the same.

Figure 1:
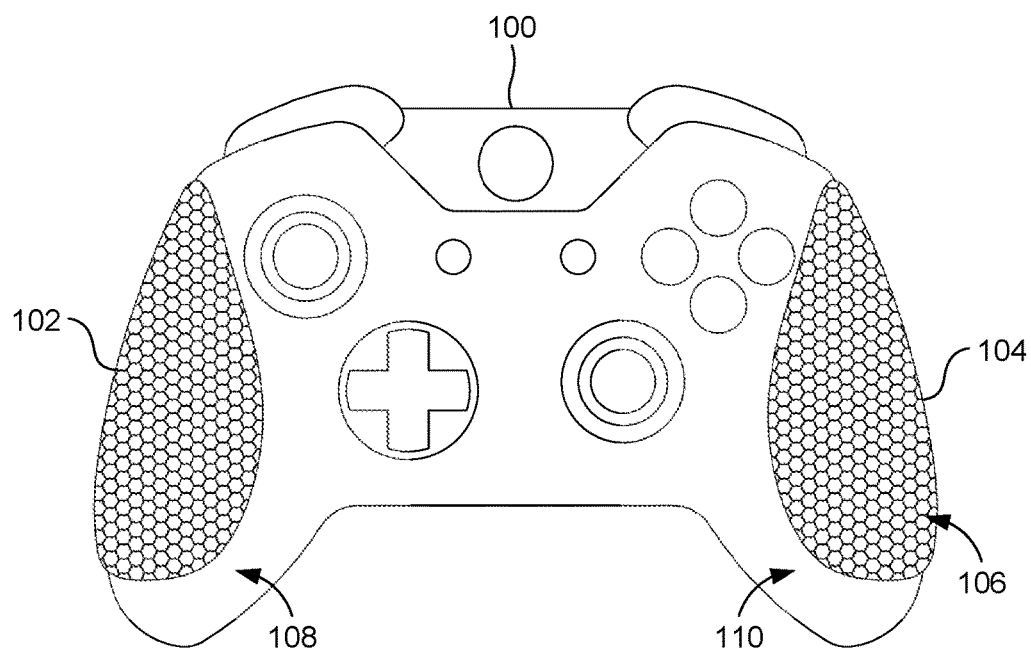
FIG. 1 is a drawing of a front perspective of a handheld controller with a left grip and a right grip illustrated in an optimal position.

FIG. 1 is a front perspective overview of an example embodiment of an ergonomic handheld controller grip. The handheld controller (100) is viewed from the front perspective illustrating the left grip (102) and right grip (104). The left grip (102) and right grip (104) are placed in respective areas where a user grips the handheld controller. As disclosed in the example embodiment the left grip (102) and right grip (104) are removable and re-attachable for added customization for independent grip styles by users. In the example embodiment in FIG. 1, the left grip (102) and right grip (104) include a grip body having a texturized grip surface (106). The texturized grip surface (106) provides traction and grip for the user. The traction also plays a key role in preventing damage to the handheld controller by assisting in the prevention of sudden drops.

As shown in FIG. 1, the left grip (102) is shown removably attached to a first handle portion (108) of the handheld controller (100) by wrapping around the first handle portion. The right grip (104) is shown removably attached to a second handle portion (110) of the handheld controller (100) by wrapping around the second handle portion (110). These features are further shown in FIG. 2.

Figure 2:
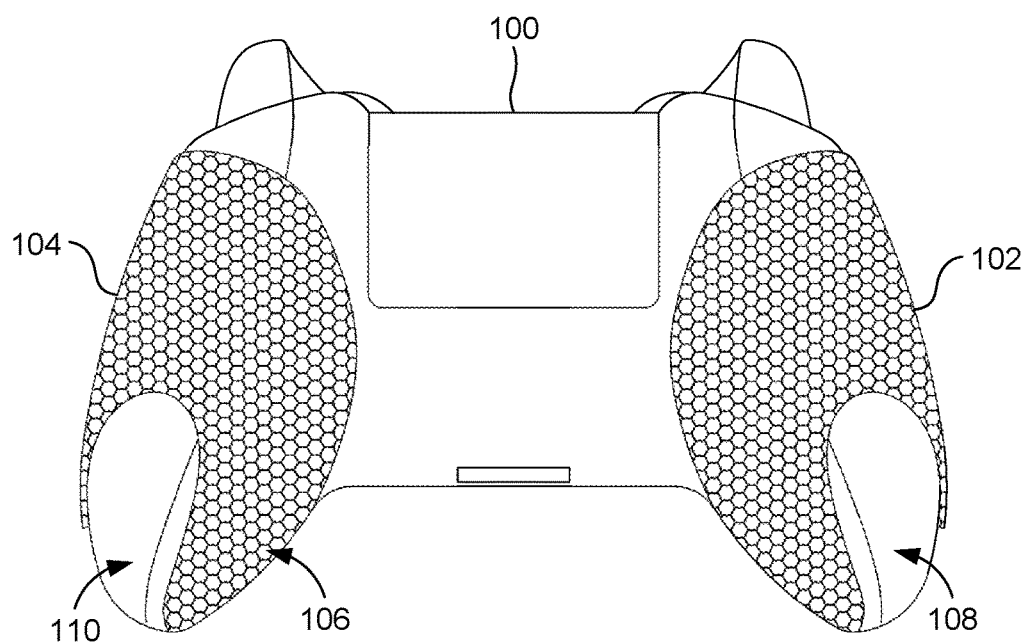
FIG. 2 is a drawing of a rear perspective of a handheld controller with a left grip and a right grip illustrated in an optimal position.

FIG. 2 is a rear perspective overview of an example embodiment of an ergonomic handheld controller grip. The handheld controller rear perspective depicts the right grip (104) and the left grip (102). As disclosed in the example embodiment the right grip (202) and left grip (204) are removable and re-attachable for added customization for independent grip styles by users. In the example embodiment in FIG. 1 the right grip (104) and the left grip (102) show a texturized grip surface (106). The texturized grip surface (106) provides traction and grip for the user. Also, the texturized grip surface (106) provides moisture wicking properties that eliminate condensation and build up from a user's grip. Additionally, in the example embodiment the texturized grip surface (106) has anti-microbial properties embedded into the material that help eliminate bacteria from the surface.

As shown between the front and rear perspective views of FIG. 1 and FIG. 2, respectively, when the left grip (102) is wrapped around the first handle portion (108) of the handheld controller (100), the left grip (102) can be described as having a first portion positioned on a front side of the first handle portion (108) facing the operator and a second portion positioned on a rear side of the first handle portion (108) facing away from the operator during use of the handheld controller (100). Similarly, as shown between the front and rear perspective views of FIG. 1 and FIG. 2, respectively, when the right grip (104) is wrapped around the second handle portion (110) of the handheld controller (100), the right grip (104) can be described as having a first portion positioned on a front side of the second handle portion (110) facing the operator and a second portion positioned on a rear side of the second handle portion (110) facing away from the operator during use of the handheld controller (100).

Figure 3:
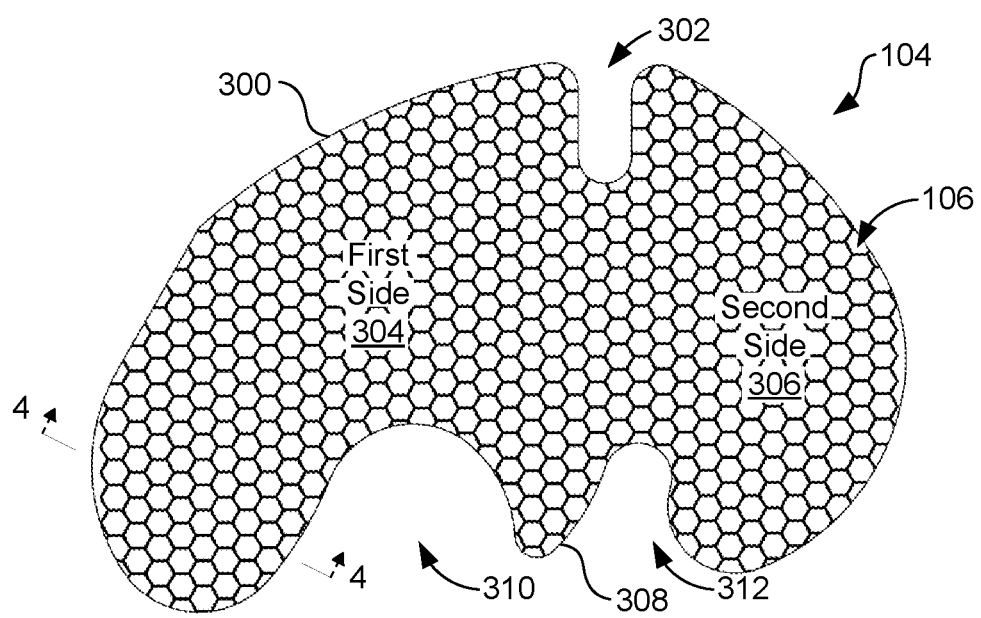
FIG. 3 is a drawing of a right grip from the front perspective.

FIG. 3 is a front perspective overview of an example embodiment of a right grip (104) that is not attached to a handheld controller (100). The configuration of this example embodiment depicted is for the Microsoft Xbox™ gaming controller. Other handheld controllers can be manufactured and the handheld controller grip can be made to modify the differing exterior designs. Examples of types of handheld controllers are controllers used in the maneuvering of remotely operated vehicles, controllers for use in virtual reality devices, controllers for use in video game consoles, controllers for use in directing robotics, and many others that will occur to those of skill in the art. The right grip (104) includes a grip body 300 having a texturized grip surface (106), which enhances the user control and grip. The texturized grip surface (106) further provides moisture wicking and antimicrobial properties. The pattern on the texturized grip surface (106) is one of many that facilitates wicking, grip, and comfort, though many other patterns are available and will not depart from the spirit of the disclosure.

As shown in FIG. 3, the grip body (300) includes a U-shaped recess (302) positioned between the first side (304) and the second side (306) of the grip body (300). As may be appreciated, the U-shaped recess (302) facilitates an application and a folding or wrapping of the grip body (300) around the second handle portion (110) of the handheld controller (100). The U-shaped recess (302) is shown in FIG. 3 on a top portion of the grip body (300). The grip body (300) is shown further including a projecting portion (308) extending downward from the grip body (300). The projecting portion (308) is shown offset from the U-shaped recess (302). The projecting portion (308) is defined by a first bottom recess (310) and a second bottom recess (312).

Figure 4:
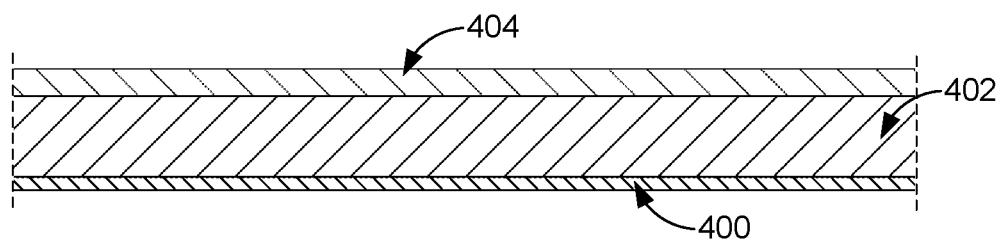
FIG. 4 is a drawing of the multilayered grip illustrating an adhesive layer, a comfort layer, and a texture layer.

FIG. 4 is an example embodiment of a zoomed in side view of the multilayered handheld controller grip. The adhesive layer (400) is the primary layer that contacts the plastic or resin based shell, or exterior surface, of the handheld controller (100). In the present embodiment 3M™ Double Coated Tape with Adhesive 300MP is utilized as the adhesive layer (400). 3M™ Double Coated Tapes with Adhesive 300 MP are general purpose tapes that provide excellent adhesion to a wide variety of substrates, including many foams, plastics, foil, and felt. The Double Coated Tapes are well suited for applications with ranging temperatures up to 250 degrees Fahrenheit.

Physical properties and characteristics of 3M™ Double Coated Tape with Adhesive is described herein:

3M ™ Double Coated Tapes with Adhesive 300MP
9832 · 9832HL
Typical Physical Properties and Performance Characteristics
Note: The following technical information and
data should be considered representative or
typical only and should not be used for specification purposes.

| Product | 3M ™ Double Coated Tape 9832 oz/in (N/100 mm) | 3M ™ Double Coated Tape 9832HL oz/in (N/100 mm) |
| --- | --- | --- |
| Adhesion to stainless steel ASTM D3330 - 90 degree | | |
| 15 minute RT | 56 (61) | 56 (61) |
| 72 hour RT | 58 (63) | 58 (63) |
| 72 hour 158° F. | 86 (94) | 86 (94) |
| ASTM D3330 - 180 degree, 2.0 mil aluminum foil | | |
| 72 hour RT | 94 (103) | 94 (103) |
| Adhesion to other surfaces ASTM D3330 - 90 degree, 2.0 mil aluminum foil, 72 hour RT | | |
| ABS | 58 (63) | 58 (63) |
| Polycarbonate | 66 (72) | 66 (72) |
| Polycarbonate | 34 (35) | 34 (35) |
| Shear strength - ASTM D3654 Modified - (0.5 inch square sample size) | | |
| 1000 grams at 72° F. | 2289 minutes | 2289 minutes |
| 500 grams at 158° F. | 1139 minutes | 1139 minutes |
| Relative High Temperature Operating Ranges | | |
| Long Term (days, weeks) | 150° F. | 150° F. |
| Short Term (minutes, hours) | 250° F. | 250° F. |

The adhesive layer (400) in the example embodiment may contain alternative varieties of the adhesive tape as will occur to those of skill in the art. The properties maintain the adhesion is removable and capable of replacement on the same handheld controller (100) or an additional handheld controller. The adhesive layer (400) further leaves little to no residue behind when removed from the handheld controller device allowing for rapid changes to suit user preference.

The adhesive layer (400) in the example embodiment has a permanent tape layer affixed to the comfort layer (402). The permanent tape layer maintains secure attachment to the comfort layer (402) while maintaining temporary attachment to the handheld controller (100). The unique double sided properties of the adhesive layer allow for re-attachment of the handheld controller grip while also maintaining the structure of the multilayered design. The ability for re-attachment adds to the user's performance and experience as it allows for rapid customization without the additional application of adhesives, gels, or coatings.

In the example embodiment of FIG. 4, the comfort layer (402) is comprised of a microcellular foam substrate that offers user comfort, retention of physical properties, and resistance to compression along with energy absorption. Example products include PORON™ manufactured by Rogers Corporation. PORON™ is a microcellular sponge product that benefits from shape retention and durability. The comfort layer (402) works to provide durable, long-term performance for cushioning a user's grip on a handheld controller (100). Additional features of the current embodiment include high resiliency along with vibration isolation and impact absorption. Many additional properties such as flame retardants and chemical resistivity may be added to the comfort layer. A key component of the comfort layer (402) is to provide retention of its physical characteristics after prolonged usage. Users of handheld controllers (100) often spend long periods of continuous pressure and exposure to the handheld controller (100) and in a variety of temperatures, conditions, and climates. Therefore, it is an improvement to the traditional ergonomic design of handheld controllers (100) to add a comfort layer to help eliminate fatigue and increases control providing users with a better experience.

In the example embodiment of FIG. 4, the texture layer (404) is comprised of a rubberized shell that is laminated with antimicrobial solution. The texture layer (404) provides for moisture wicking through its rubberized structure and possesses built in texture in the form of grooves specifically designed to enhance grip and tactical feedback. A variety of shapes and patterns may be considered for use in the texture layer (404) as may be appreciated to those of skill in the art. Additionally, the texture layer (404) can include an antimicrobial laminate consisting of an application of a cleaning solution or solvent that is expected to reduce bacterial count from the user's touch. The antimicrobial laminate or applied substance may be re-applied by the user and the rubberized shell is designed to prevent destruction from the chemical or substrate applied. Examples of antimicrobial substances are KontrolFreek™ CleanFreek™ solution.

Figure 5:
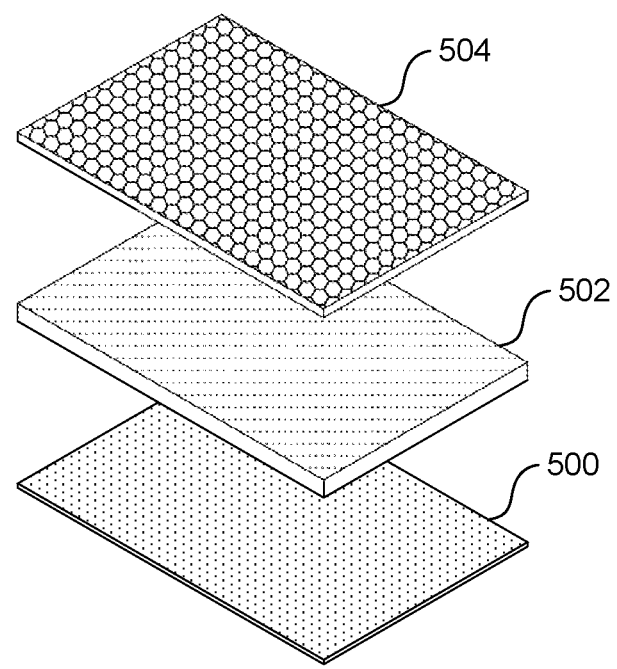
FIG. 5 is a blown-out perspective view of the multilayered grip illustrating the adhesive layer, the comfort layer, and the texture layer.

FIG. 5 sets forth an example embodiment of the multi-layered structure. The adhesive layer (500) depicts the exposed permanent adhesive surface that is bonded to the comfort layer (502). The underside of the adhesive layer forms a re-attachable surface that is capable of customization by a user to a handheld controller. The comfort layer (502) is bonded to the adhesive layer (500) and then permanently bonded to the texture layer (504) comprising the disclosed invention. In the example embodiment, the comfort layer (502) comprises PORON™, but other materials such as a gel, rubberized mat, foam, or other cushion providing memory retention materials may be used. The texture layer (504) is permanently bonded to the comfort layer (502). The texture layer (504) provides a moisture barrier from the user to the other layers protecting the integrity of the multilayered grip. Further, the texture layer (504) possesses strong abrasion resistance to handle continual daily usage while also maintaining form and structure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:
1. A system, comprising:
    a handheld video game controller;
    a first grip configured to removably attach to a first handle portion of the handheld video game controller by wrapping around the first handle portion;
    a second grip configured to removably attach to a second handle portion of the handheld video game controller by wrapping around the second handle portion;
    wherein each of the first grip and the second grip comprise a grip body sized and shaped for attachment to the first handle portion and the second handle portion, respectively, the grip body comprising:
        an adhesive layer comprising an adhesive that adheres the grip body to an exterior surface of the handle portion, wherein the adhesive permits the grip body to be positioned and repositioned on the handle portion without additional adhesive being applied;
        a texture layer having a hardened rubber substrate configured to contact a hand of an operator of the handheld video game controller, the texture layer providing a texturized grip and having an antimicrobial property; and
        a comfort layer positioned between the adhesive layer and the texture layer, wherein the comfort layer comprises a microcellular foam substrate that absorbs pressure and contours to the hand of the operator.

2. The system of claim 1, wherein the adhesive layer is double sided with one side being capable of attachment and removal to the exterior surface of the handle portion of the handheld video game controller and the other side comprising a permanent attachment to the comfort layer.

3. The system of claim 1, wherein the comfort layer is made of a porous material that facilitates shock absorption.

4. The system of claim 1, wherein the comfort layer comprises a gel structure having a cooling property.

5. The system of claim 1, wherein the texture layer is texturized with a grit-based substrate that prevents a sliding of the hand of the operator.

6. The system of claim 1, wherein the hardened rubber substrate is configured to repel moisture produced from the hand of the operator.

7. The system of claim 1, wherein the adhesive is adapted to leave no residue on the exterior surface of the handheld video game controller when the grip body is removed from the handle portion.

8. The system of claim 1, wherein the grip body further comprises:
    a first portion positioned on a front side of the handle portion of the handheld video game controller facing the operator; and
    a second portion positioned on a rear side of the handle portion of the handheld video game controller.

9. The system of claim 8, wherein the grip body comprises a U-shaped recess positioned between the front side and the rear side that facilitates an application and folding of the grip body, the U-shaped recess being on a top portion of the grip body.

10. The system of claim 9, wherein the grip body further comprises a projecting portion extending downward from the grip body and being offset from the U-shaped recess.

11. The system of claim 10, wherein the projecting portion is defined by a first bottom recess and a second bottom recess.

12. A grip configured to removably attach to a handle portion of a handheld controller, the grip comprising:
    a grip body sized and shaped for removable attachment to the handheld controller by wrapping around the handle portion of the handheld controller, the grip body comprising:
        an adhesive layer comprising an adhesive that adheres the grip body to an exterior surface of the handle portion, wherein the adhesive permits the grip body to be positioned and repositioned on the handle portion without additional adhesive being applied, wherein the adhesive is adapted to leave no residue on the exterior surface of the handheld controller when the grip body is removed from the handle portion;

a texture layer configured to contact a hand of an operator of the handheld controller, the texture layer having a hardened rubber substrate that provides a texturized grip; and a comfort layer positioned between the adhesive layer and the texture layer, wherein the comfort layer is constructed of material that absorbs pressure and is capable of contouring to the hand of the operator.

13. The grip of claim 12, wherein:

the adhesive layer is double sided with one side being configured to removably attach to the exterior surface of the handle portion of the handheld controller and the other side comprising a permanent attachment to the comfort layer;

the comfort layer is made of a porous material that facilitates shock absorption and comprises a gel structure having a cooling property; and the texture layer is texturized with a grit-based substrate that prevents a sliding of the hand of the operator, the hardened rubber substrate being configured to repel moisture produced from the hand of the operator.

14. The grip of claim 12, wherein the grip body further comprises:

a first portion positioned on a first side of the handle portion of the handheld controller facing the operator;

a second portion positioned on a second side of the handle portion of the handheld controller;

a U-shaped recess positioned between the first side and the second side that facilitates an application and folding of the grip body, the U-shaped recess being on a top portion of the grip body; and a projecting portion extending downward from the grip body and being offset from the U-shaped recess.

15. The grip of claim 14, wherein the projecting portion is defined by a first bottom recess and a second bottom recess.

16. A method, comprising:

providing a handheld controller;

attaching a first grip to a first handle portion of the handheld controller by wrapping the first grip around the first handle portion;

attaching a second grip to a second handle portion of the handheld controller by wrapping around the second handle portion; and wherein each of the first grip and the second grip comprise a grip body sized and shaped for attachment to the first handle portion and the second handle portion, respectively, the grip body comprising:

an adhesive layer comprising an adhesive that adheres the grip body to an exterior surface of the handle portion, wherein the adhesive permits the grip body to be positioned and repositioned on the handle portion without additional adhesive being applied;

a texture layer having a hardened rubber substrate configured to contact a hand of an operator of the handheld controller, the texture layer providing a texturized grip and having an antimicrobial property; and a comfort layer positioned between the adhesive layer and the texture layer, wherein the comfort layer comprises a microcellular foam substrate that absorbs pressure and contours to the hand of the operator.

17. The method of claim 16, wherein the grip body further comprises:

a first portion positioned on a first side of the handle portion of the handheld controller facing the operator;

a second portion positioned on a second side of the handle portion of the handheld controller;

a U-shaped recess positioned between the first side and the second side that facilitates an application and folding of the grip body, the U-shaped recess being on a top portion of the grip body; and a projecting portion extending downward from the grip body and being offset from the U-shaped recess.

* * * * *